(12) United States Patent
Kaneuchi et al.

(10) Patent No.: US 10,527,800 B2
(45) Date of Patent: Jan. 7, 2020

(54) METHOD FOR MANUFACTURING OPTICAL CONNECTION COMPONENT

(71) Applicant: SUMITOMO ELECTRIC INDUSTRIES, LTD., Osaka-shi (JP)

(72) Inventors: Yasuomi Kaneuchi, Yokohama (JP); Takashi Sasaki, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 16/226,746

(22) Filed: Dec. 20, 2018

(65) Prior Publication Data

US 2019/0129101 A1 May 2, 2019

Related U.S. Application Data

(63) Continuation of application No. PCT/JP2016/071069, filed on Jul. 15, 2016.

(51) Int. Cl.
*G02B 6/38* (2006.01)
*C03B 37/15* (2006.01)
*G02B 6/12* (2006.01)

(52) U.S. Cl.
CPC ............ *G02B 6/3855* (2013.01); *C03B 37/15* (2013.01); *G02B 6/3829* (2013.01); *C03B 2205/67* (2013.01); *G02B 2006/12119* (2013.01)

(58) Field of Classification Search
CPC .. G02B 6/3829; G02B 6/3855; G02B 6/3857; G02B 6/3858; G02B 6/4289; G02B 2006/12119; C03B 37/15; C03B 2205/67

USPC ...... 385/32, 76–78, 81, 86, 87; 65/385, 392, 65/402
See application file for complete search history.

(56) References Cited

U.S. PATENT DOCUMENTS

| 4,276,113 A | * | 6/1981 | Carlsen | G02B 6/255 156/158 |
| 4,784,456 A | * | 11/1988 | Smith | G02B 6/3805 385/55 |
| 4,804,248 A | * | 2/1989 | Bhagavatula | H04B 10/2581 385/28 |

(Continued)

FOREIGN PATENT DOCUMENTS

| JP | 2004-325622 A | 11/2004 |
| JP | 2012-032725 A | 2/2012 |

(Continued)

*Primary Examiner* — Robert Tavlykaev
(74) *Attorney, Agent, or Firm* — Baker Botts L.L.P.; Michael A. Sartori

(57) ABSTRACT

The present embodiment makes it possible to reduce the height of an optical connection component including a bent optical fiber having a bent-shape part and a fiber fixing component in a safer and more stable manner compared to a conventional technique. Before the fiber fixing component is fixed to the bent optical fiber, formation of a bent portion using the fiber fixing component obliquely disposed and heating of the bent portion are repeated a plurality of times for the optical fiber to which the fiber fixing component is movably fitted. At that time, movement of the optical fiber and the heating of the bent portion are alternately repeated. Thus, a plurality of bent portions where stress is released is formed in the optical fiber along the longitudinal direction thereof.

7 Claims, 22 Drawing Sheets

(56) References Cited

U.S. PATENT DOCUMENTS

| | | | |
|---|---|---|---|
| 6,295,398 B1* | 9/2001 | Gillham | G02B 6/2552 385/16 |
| 8,014,644 B2* | 9/2011 | Morimoto | G02B 6/2552 385/123 |
| 10,386,578 B2* | 8/2019 | Zheng | G02B 6/32 |
| 2002/0057872 A1* | 5/2002 | Nishikawa | G02B 6/2552 385/32 |
| 2007/0269162 A1* | 11/2007 | Schroll | G02B 6/2852 385/32 |
| 2010/0119199 A1* | 5/2010 | Tanaka | A61B 1/0011 385/115 |
| 2011/0058768 A1* | 3/2011 | Swinehart | B29D 11/00663 385/13 |
| 2011/0198765 A1* | 8/2011 | Sasaki | G02B 6/2552 264/1.24 |
| 2013/0263628 A1* | 10/2013 | Sasaki | G02B 6/2552 65/402 |
| 2015/0336842 A1 | 11/2015 | Kaneuchi et al. | |

FOREIGN PATENT DOCUMENTS

| | | | | |
|---|---|---|---|---|
| JP | 2012-132972 A | 7/2012 | | |
| JP | 5226797 B2 | 3/2013 | | |
| JP | WO 2015/076105 A1 * | 5/2015 | | G02B 6/02 |
| JP | 2015-218090 A | 12/2015 | | |
| WO | 2012029157 A1 | 3/2012 | | |

* cited by examiner

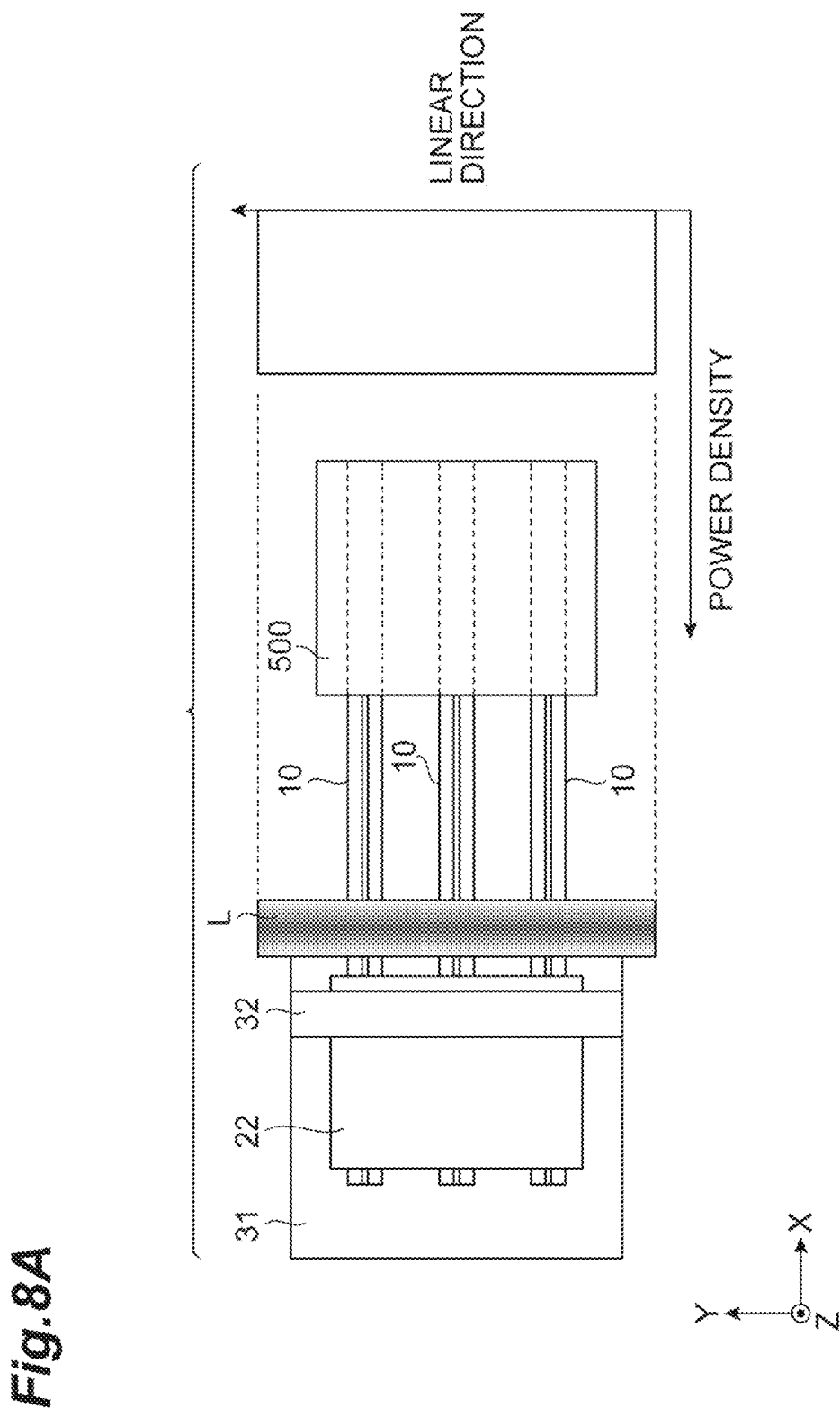

METHOD FOR MANUFACTURING OPTICAL CONNECTION COMPONENT

CROSS-REFERENCE TO RELATED APPLICATIONS

This application is a continuation application of PCT/JP2016/071069 filed on Jul. 15, 2016, the entire contents of which are incorporated herein by reference.

TECHNICAL FIELD

The present invention relates to a method for manufacturing an optical connection component including a bent optical fiber obtained by bending part of an optical fiber comprised of silica-based glass.

BACKGROUND ART

Along with size reduction of an optical module, it is required to reduce the height of an optical fiber used near the optical module (to make the height of the optical fiber whose one end is vertically connected to an electronic substrate or the like from the substrate). In order to reduce the height of the optical fiber, it is necessary to form a bent portion in the optical fiber.

Patent Document 1 discloses an optical fiber component constituted by an optical component main body and an optical fiber and configured such that the optical fiber is obliquely attached so as to form a certain angle (preferably 10° or more) with respect to a center line of the optical component main body. This Patent Document 1 discloses that there is a case where a sharp bend is generated in the optical fiber when the optical fiber is attached obliquely to the center line of the optical component main body, there is a problem that great deformation of the optical fiber is generated in this sharp bent portion so that mechanical reliability of the optical fiber is deteriorated, and the deformation is removed by heating the sharp bent portion in order to secure mechanical reliability of the optical fiber. In addition, Patent Document 1 discloses that electric discharge, a carbon dioxide laser, a gas burner, or the like can be used as heating means for eliminating deformation.

Patent Document 2 discloses an apparatus for bending an optical fiber by continuously heating a certain range of the optical fiber with non-contact heating means while relatively moving the optical fiber and the non-contact heating means. In addition, Patent Document 2 discloses that arc discharge is preferably used as the non-contact heating means.

A manufacturing method disclosed in Patent Document 3 comprises a bent optical fiber forming step of forming a bent optical fiber such that no bending stress deformation remains while heating an optical fiber with a heater or the like, and a ferrule assembling step. The ferrule assembling step is carried out before or after the bent optical fiber forming step, ferrules are inserted into linear parts located at both ends of the bent optical fiber or located at both ends of the optical fiber before subjected to the bent optical fiber forming step, and these ferrules are fixed to the linear parts, respectively, by an adhesive or the like.

CITATION LIST

Patent Literature

Patent Document 1: Japanese Patent Application Laid-Open No. 2004-325622
Patent Document 2: Japanese Patent No. 5226797
Patent Document 3: Japanese Patent Application Laid-Open No. 2012-32725

SUMMARY OF INVENTION

Technical Problem

As a result of examining the above-described conventional techniques, the inventors found the following problems. That is, with the above-described conventional techniques, by heating part of one optical fiber, a bent optical fiber having a bent portion from which deformation is eliminated can be obtained. A fiber fixing component is attached to at least one end part of such a bent optical fiber, the fiber fixing component is fixed to the above-described substrate or the like, and thus the bent optical fiber and the substrate are connected. Note that none of the above Patent Documents 1 to 3 discloses that a plurality of bent optical fibers is collectively manufactured, and there is a possibility that quality variation of bent optical fibers individually manufactured will occur. Therefore, it is difficult to stably manufacture an optical fiber connection component by fixing a common fiber fixing component to a plurality of bent optical fibers. In addition, for example, in the example of Patent Document 2, the bent state of the optical fiber is controlled by changing the position of a lever for applying external force to a front end of the optical fiber.

In the bent optical fiber manufactured as described above, the bent portion is formed at a location separated from an end thereof by a certain distance or more. Therefore, in all the Patent Documents 1 to 3, during attachment of the fiber fixing component performed after completion of the bent optical fiber, there is a possibility that the bent optical fiber will be damaged due to concentration of external stress in the bent portion of the bent optical fiber. Similarly, in a case where a common fiber fixing component is attached to each of a plurality of bent optical fibers individually manufactured, the likelihood that each of the bent optical fibers will be damaged further increases. In such a situation, it is inevitable that the manufacturing yield lowers.

Note that in a case where a ferrule assembling step is performed before formation of a bent part in a bent optical fiber forming step as in the example disclosed in Patent Document 3, in order to avoid thermal deformation or the like of a fiber fixing component, it is necessary that the fiber fixing component attached and a heated region to be bent must be separated by a certain distance or more. In a structure requiring a thermal buffer section between the bent portion of the bent optical fiber obtained and the fiber fixing component, there is a limit in reduction of the height of the optical fiber.

The present invention has been made to solve the above-described problems, and an object of the present invention to provide a method for manufacturing an optical connection component including a structure for making it possible to reduce the height of the optical connection component including not only one bent optical fiber but a plurality of bent optical fibers in a safer and more stable manner compared with conventional techniques without lowering the manufacturing yield.

Solution to Problem

In a method for manufacturing an optical connection component according to the present embodiment, an optical connection component including a bent optical fiber having a bent-shape part and a fiber fixing component attached to the bent optical fiber is manufactured. Specifically, the method comprises at least a pre-step, a fitting step, a bent optical fiber manufacturing step, and a fixing step, and the bent optical fiber manufacturing step includes an elastic bending step and a heating step. The pre-step includes preparing an optical fiber comprised of silica-based glass, and preparing a first fiber fixing component that has a structure for limiting movement of the optical fiber in a direction orthogonal to the longitudinal direction of the optical fiber. The fitting step includes fitting the first fiber fixing component on one end part of the optical fiber in a state movable in the longitudinal direction, and fixing the other end part of the optical fiber to a fiber feeding mechanism (including a second fiber fixing component). Specifically, the other end part of the optical fiber is gripped by the second fiber fixing component. The bent optical fiber manufacturing step is a step of, to form a bent-shape part in the optical fiber, forming a plurality of bent portions in the optical fiber in which the above bent shape part is to be formed, the plurality of bent portions being separated from each other along the longitudinal direction of the optical fiber, and a pair of the elastic bending step and the heating step is repeated a plurality of times. In addition, the fixing step includes fixing, after the relative positions of the bent-shape part of the bent optical fiber obtained after being subjected the bent optical fiber manufacturing step and the first fiber fixing component are adjusted, the first fiber fixing component to the bent optical fiber.

Here, in the elastic bending step constituting part of the bent optical fiber manufacturing step, while the optical fiber is fed toward the first fiber fixing component by the fiber feeding mechanism, the posture of the first fiber fixing component is inclined by a predetermined angle with respect to the feeding direction of the optical fiber. Thus, a bent portion is formed in the optical fiber. In addition, the heating step, constituting part of the bent optical fiber manufacturing step, includes heating and softening the bent portion formed in the elastic bending step to release stress in the bent portion. While changing the inclination angle of the first fiber fixing component with respect to the feeding direction of the optical fiber in the elastic bending step so that the inclination angle becomes greater stepwise every time the elastic bending step is performed, the pair of the elastic bending step and the heating step is repeated a plurality of times. Thus, a plurality of bent portions separated from each other along the longitudinal direction is formed in the optical fiber.

Advantageous Effects of Invention

According to the present embodiment, since the optical fiber can move along the longitudinal direction thereof upon formation of the bent portion in the optical fiber, the risk that the bent optical fiber finally obtained will be damaged is reduced. In addition, upon formation of the bent portion in the optical fiber, the optical fiber to which the first fiber fixing component is fitted in advance is in a state movable along the longitudinal direction thereof. Therefore, a sharp bent section (section where the curvature changes maximally) in the formed bent portion is less likely to be formed. Further, according to the present embodiment, it is possible to suppress lowering of the manufacturing yield due to damage or the like of the bent optical fiber obtained and to more stably adjust the position of and to fix the first fiber fixing component. In addition, even in a case of handling a plurality of bent optical fibers integrally, arrangement of the plurality of optical fibers is fixed by the common first fiber fixing component fitted before the bending processing. Therefore, quality variation between the plurality of bent optical fibers obtained is reduced (consistent quality of the bent optical fibers). In addition, it is easy to adjust the position of and to fix the first fiber fixing component to the plurality of bent optical fibers.

Note that the first fiber fixing component has an end surface on the front end side of the optical fiber and an end surface on the side where the bent portion is formed in a state of being inserted into the one end part of the optical fiber, and "position adjustment of the first fiber fixing component" means adjustment of the position of the end surface of the first fiber fixing component on the side where the bent portion is formed (position affecting formation of the bent portion). In addition, regarding fixation of the bent optical fiber, the fiber feeding mechanism (the second fiber fixing component) contributes to fixation in the longitudinal direction of the bent optical fiber, and the first fiber fixing component contributes to fixation in the curvature radius direction of the bent optical fiber. "Quality variation" means that the curvature that defines the bent shape changes along the longitudinal direction of the bent optical fiber between the plurality of bent optical fibers obtained.

BRIEF DESCRIPTION OF DRAWINGS

FIG. 8A is a diagram illustrating power distribution of a laser beam emitted to bent portions of a plurality of optical fibers in the heating step using laser beam irradiation.

DESCRIPTION OF EMBODIMENTS

Figure 1A:
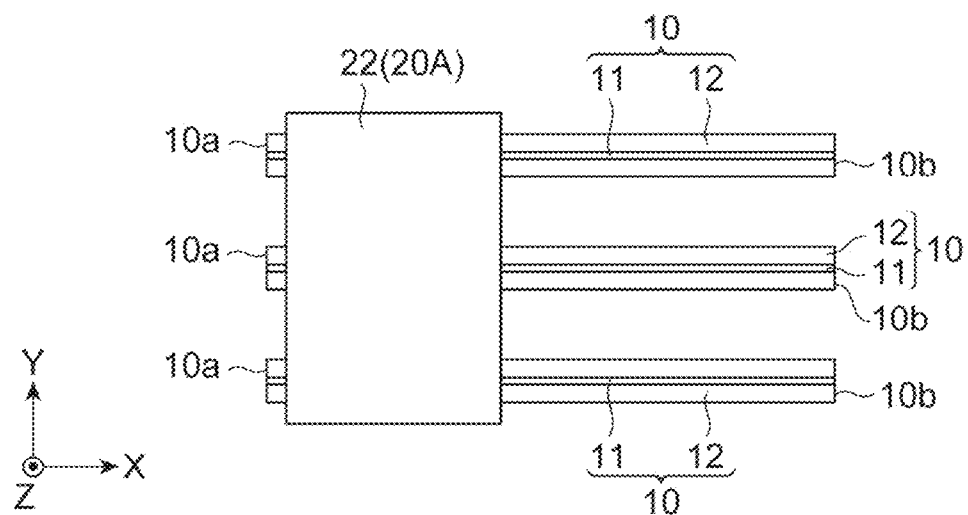
FIG. 1A is a top view for explaining one example of a step (pre-step) of preparing an optical fiber 10 and a first fiber fixing component 20A (a V-groove substrate and a lid).

Description of Embodiment of Invention of Present Application

First, each aspect of an embodiment the invention of the present application will be individually pointed out and explained.

(1) In a method for manufacturing an optical connection component according to the present embodiment, an optical connection component including a bent optical fiber having a bent-shape part and a fiber fixing component attached to the bent optical fiber is manufactured. Specifically, as one aspect of the present embodiment, the method comprises at least a pre-step, a fitting step, a bent optical fiber manufacturing step, and a fixing step, and the bent optical fiber manufacturing step includes an elastic bending step and a heating step. The pre-step includes preparing an optical fiber comprised of silica-based glass, and preparing a first fiber fixing component that has a structure for limiting movement of the optical fiber in a direction orthogonal to the longitudinal direction of the optical fiber. The fitting step includes fitting the first fiber fixing component on one end part of the optical fiber in a state movable in the longitudinal direction, and fixing the other end part of the optical fiber to a fiber feeding mechanism. As one example of a configuration for fixing the other end part of the optical fiber to the fiber feeding mechanism, for example, the other end part of the optical fiber is gripped by a second fiber fixing component, and the second fiber fixing component is fixed to a stage (hereinafter referred to as a "gripping stage") movable along a predetermined direction. The bent optical fiber manufacturing step is a step of, to form a bent-shape part in the optical fiber, forming a plurality of bent portions in the optical fiber in which the above bent shape part is to be formed, the plurality of bent portions being separated from each other along the longitudinal direction of the optical fiber, and a pair of the elastic bending step and the heating step is repeated a plurality of times. In addition, the fixing step includes fixing, after the relative positions of the bent-shape part of the bent optical fiber obtained after being subjected the bent optical fiber manufacturing step and the first fiber fixing component are adjusted, the first fiber fixing component to the bent optical fiber.

In addition, in the elastic bending step constituting part of the bent optical fiber manufacturing step, while the optical fiber is fed toward the first fiber fixing component by the fiber feeding mechanism, the posture of the first fiber fixing component is inclined by a predetermined angle with respect to the feeding direction of the optical fiber. Thus, a bent portion is formed in the optical fiber. In addition, the heating step, constituting part of the bent optical fiber manufacturing step, includes heating and softening the bent portion formed in the elastic bending step to release stress in the bent portion. In the bent optical fiber manufacturing step, the pair of the elastic bending step and the heating step is repeated a plurality of times, so that the heating steps are intermittently performed with optical fiber feeding operation (moving operation of the optical fiber along the longitudinal direction) interposed therebetween. That is, in the bent optical fiber manufacturing step, movement of the optical fiber along the longitudinal direction and heating of the bent portion formed in the elastic bending step are alternately performed. Further, in the elastic bending step, the inclination angle of the first fiber fixing component with respect to the feeding direction of the optical fiber is changed so as to increase stepwise every time the elastic bending step is carried out. With this configuration, it is possible to shift the location where the bent portion is formed along the longitudinal direction of the optical fiber without changing the heating location.

(2) As an aspect of the present embodiment, in the fixing step, an end part of the first fiber fixing component and the start end of the bent-shape part may match with each other. It is possible to adjust the position of the first fiber fixing component after bending processing of the optical fiber. Therefore, before the bending processing, the first fiber fixing component can be retracted to a location where the first fiber fixing component is not affected by heating processing on the optical fiber. In contrast, after the bending processing, the first fiber fixing component can be arranged close to the bent-shape part.

(3) As an aspect of the present embodiment, the heating step preferably include emitting a laser beam to heat the bent portion formed in the elastic bending step. In addition, as an aspect of the present embodiment, it is preferable that the first fiber fixing component is fixed to a rotating component rotatable about a predetermined rotary shaft. In this case, by rotating the rotating component about the rotary shaft in a state where the first fiber fixing component is fixed, the posture of the first fiber fixing component with respect to the feeding direction of the optical fiber is changed.

(4) As an aspect of the present embodiment, the pre-step may include preparing a plurality of optical fibers. In this case, the fitting step includes fitting the common first fiber fixing component to one end parts of the plurality of optical fibers arranged in parallel in a predetermined direction in a state movable in the longitudinal direction of the plurality of optical fibers, and other ends of the plurality of optical fibers are fixed to the fiber feeding mechanism. Then, for each of the plurality of optical fibers to which the common first fiber fixing component is movably fitted, the bent optical fiber manufacturing step and the fixing step are carried out. By restricting arrangement of the plurality of optical fibers by the common first fiber fixing component as described above, quality variation of the plurality of bent optical fibers obtained is reduced. As a configuration for fixing the other end parts of the plurality of optical fibers to the fiber feeding mechanism, as described above, the second fiber fixing component gripping the other end parts of the plurality of optical fibers may be fixed to the gripping stage movable along the predetermined direction. In this case, the fiber feeding mechanism includes the second fiber fixing component and the gripping stage.

(5) Note that as an aspect of the present embodiment, in the heating step using laser beam irradiation, a laser beam may have a non-circular beam cross-section long in a predetermined direction. Further, as an aspect of the present embodiment, in the heating step using laser beam irradiation, each of the bent portions of the plurality of optical fibers formed in the elastic bending step may be heated by using the laser beam scanning mechanism to scan laser beam irradiation locations on the bent portions of the plurality of optical fibers along the predetermined direction. As an aspect of the present embodiment, in the heating step using laser beam irradiation, each of the bent portions of the plurality of optical fibers formed in the elastic bending step may be heated by using the optical fiber moving mechanism to scan the bent portions of the plurality of optical fibers along the predetermined direction in a state where the laser beam irradiation location is fixed.

As described above, each aspect pointed out in the [Description of Embodiment of Present Application] can be applied to all of the remaining aspects or to all combinations of the remaining aspects.

Details of Embodiment of Invention of Present Application

Hereinafter, aspects for implementing the present invention will be described in detail with reference to the accompanying drawings. Note that in the description of the drawings, identical elements are denoted by identical reference signs, and overlapping descriptions are omitted. The present invention is not limited to these examples but is intended to be indicated by the claims and to include all modifications within the meaning and the scope of the claims and the equivalents thereof.

Figure 1B:
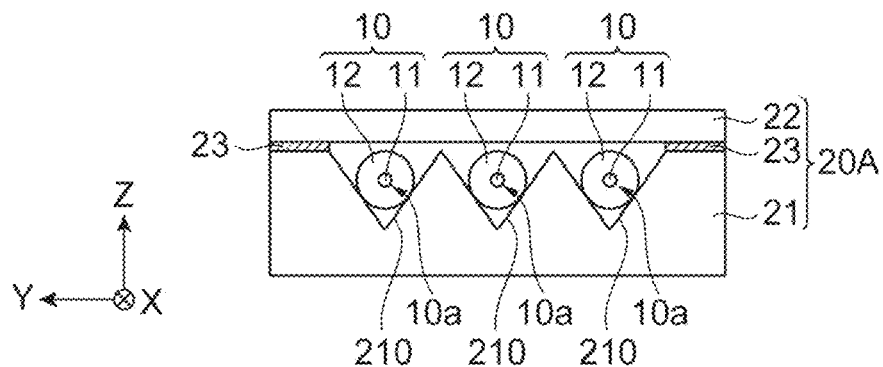
FIG. 1B is a front view for explaining the one example of the step (pre-step) of preparing the optical fiber 10 and the first fiber fixing component 20A (the V-groove substrate and the lid).
Figure 1C:
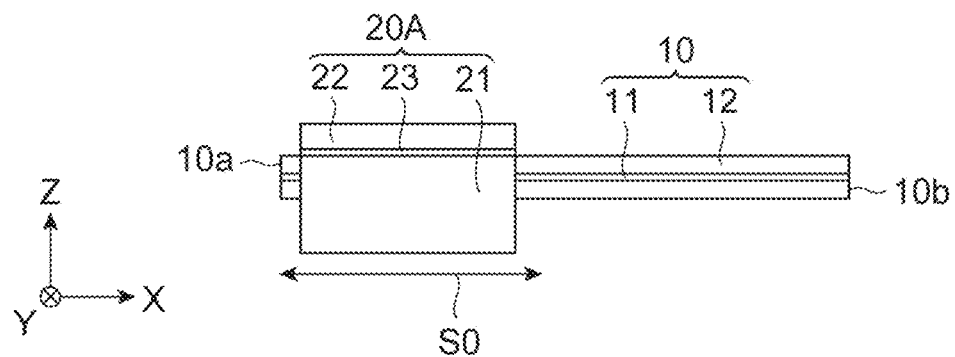
FIG. 1C is a side view for explaining the one example of the step (pre-step) of preparing the optical fiber 10 and the first fiber fixing component 20A (the V-groove substrate and the lid).
Figure 2A:
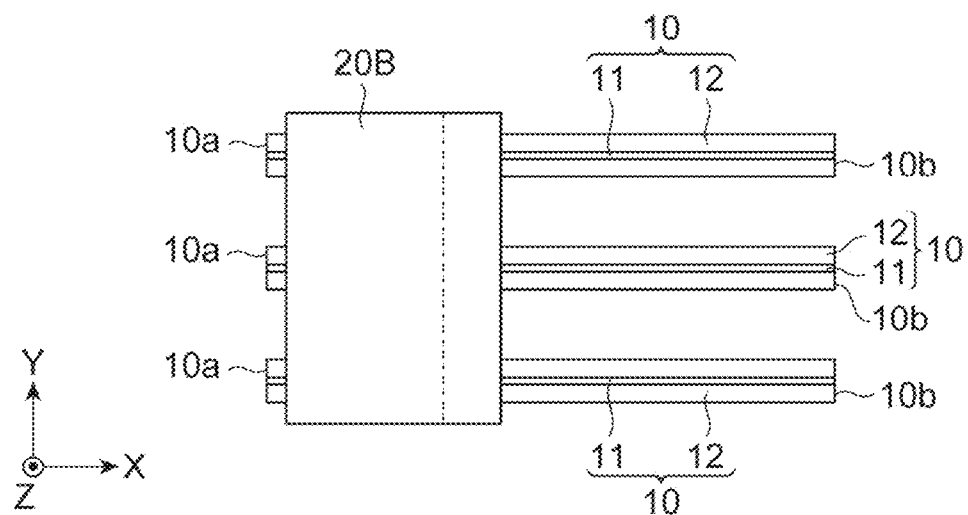
FIG. 2A is a top view for explaining another example of the step (pre-step) of preparing an optical fiber 10 and a first fiber fixing component 20B.
Figure 2B:
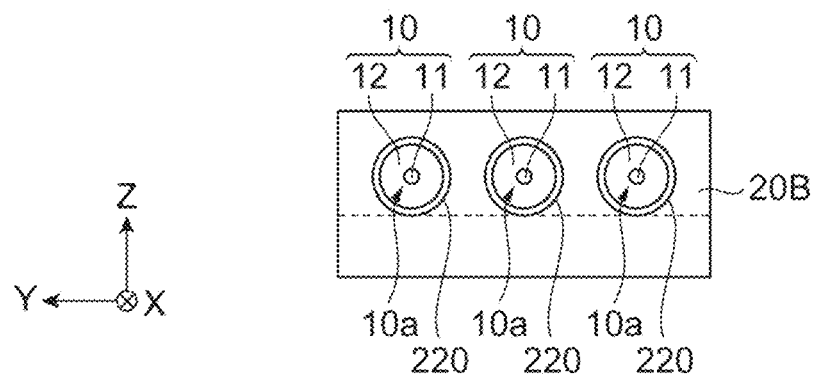
FIG. 2B is a front view for explaining the other example of the step (pre-step) of preparing the optical fiber 10 and the first fiber fixing component 20B.
Figure 2C:
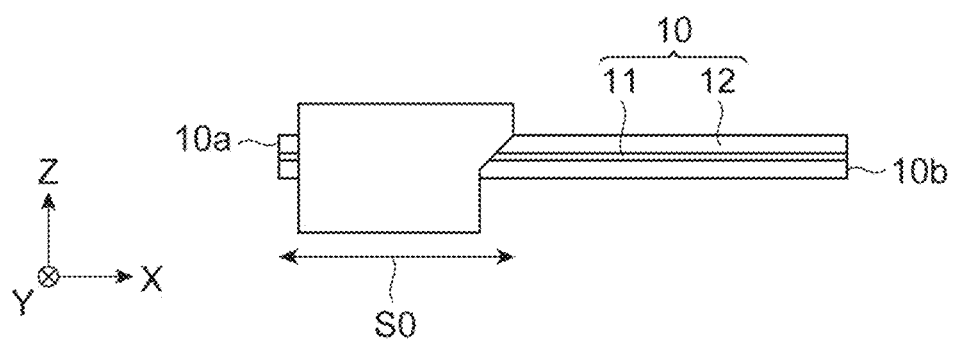
FIG. 2C is a side view for explaining the other example of the step (pre-step) of preparing the optical fiber 10 and the first fiber fixing component 20B.

In a method for manufacturing an optical connection component according to the present embodiment, first, an optical fiber 10 on each of which a bent portion is to be formed and a first fiber fixing component are prepared. FIGS. 1A to 1C illustrate an example of a step (pre-step) of preparing the optical fiber 10 and a first fiber fixing component 20A having a first structure, as one step of the method for manufacturing the optical connection component according to the present embodiment. In addition, FIGS. 2A to 2C illustrate another example of the step (pre-step) of preparing the optical fiber 10 and a first fiber fixing component 20B having a second structure, as one step of the method for manufacturing the optical connection component according to the present embodiment. Note that the FIGS. 1A and 2A are top views, FIGS. 1B and 2B are front views, and FIGS. 1C and 2C are side views.

In one example of the pre-step illustrated in FIGS. 1A to 1C, the optical fiber 10 to be prepared is comprised of silica-based glass and has a core 11 and a cladding 12. One optical fiber 10 may be used, or a plurality of optical fibers 10 may be arranged in parallel. The optical fiber 10 may have a single core or a plurality of cores. In a region where a bent portion is formed in the optical fiber 10, a resin coating layer is removed and a glass part of the optical fiber 10 is exposed, but in other regions, the resin coating layer may be provided. A connection component such as an optical connector may be provided at a front end of the optical fiber 10. In the example illustrated in FIGS. 1A to 1C, the first fiber fixing component 20A is fitted to first end 10a sides of the three optical fibers 10 arranged in parallel. The first fiber fixing component 20A is configured of a V-groove substrate 21 and a lid (for example, a cover glass) 22. In the V-groove substrate 21, V-grooves 210 for arranging the optical fibers 10 in parallel in the Y-axis direction are provided. In the state where the optical fibers 10 are disposed in the corresponding V-grooves 210 at predetermined intervals, the optical fibers 10 are pressed against the V-groove substrate 21 from above by the lid 22. In the first fiber fixing component 20A illustrated in this example, each of the V-grooves 210 and the lid 22 function as a structure for limiting movement of the corresponding optical fiber 10 in directions (for example, the Y-axis direction and the Z-axis direction) orthogonal to the longitudinal direction (X-axis direction) of the optical fiber 10. However, the first fiber fixing component 20A is fitted to the first end 10a side of each of the optical fibers 10 so as to be movable along the X-axis direction (longitudinal direction of each of the optical fibers 10). That is, as illustrated in FIG. 1C, only by fitting the first fiber fixing component. 20A to the first end 10a side of each of the optical fibers 10, the first fiber fixing component 20A can move in the direction indicated by arrow S0 (direction along the X axis) in FIG. 1C, with respect to each of the optical fibers 10.

In contrast, another example of the pre-step illustrated in FIGS. 2A to 2C differs from the example illustrated in FIGS. 1A to 1C with respect to the structure of the first fiber fixing component. That is, the first fiber fixing component 20B applied to the other example is, for example, a single member comprised of glass and is provided with through holes 220 into which first end 10a sides of optical fibers 10 are inserted, respectively. In addition, by inserting the first end 10a sides of the optical fibers 10 into the through holes 220 of the first fiber fixing component 20B, the optical fibers 10 are arranged in parallel in the Y-axis direction. Note that in the first fiber fixing component 20B illustrated in this example, each of the through holes 220 functions as a structure for limiting movement of the corresponding optical fiber 10 in directions (for example, the Y-axis direction and the Z-axis direction) orthogonal to the longitudinal direction (X-axis direction) of the optical fiber 10. However, the first fiber fixing component 20B is fitted to the first end 10a side of each of the optical fibers 10 so as to be movable along the X-axis direction (longitudinal direction of each of the optical fibers 10). That is, as illustrated in FIG. 2C, only by fitting the first fiber fixing component 20B to the first end 10a side of each of the optical fibers 10, the first fiber fixing component 20B can move in the direction indicated by arrow S0 (direction along the X axis) in FIG. 1C, with respect to each of the optical fibers 10.

Figure 3A:
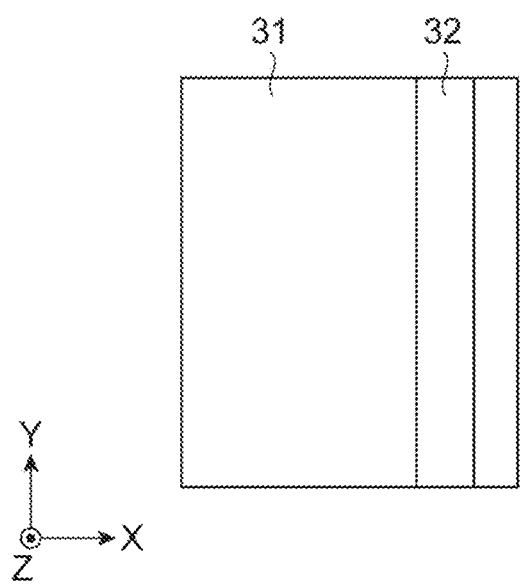
FIG. 3A is a top view for explaining a step of preparing a rotating component 31 and a fixture 32.
Figure 3B:
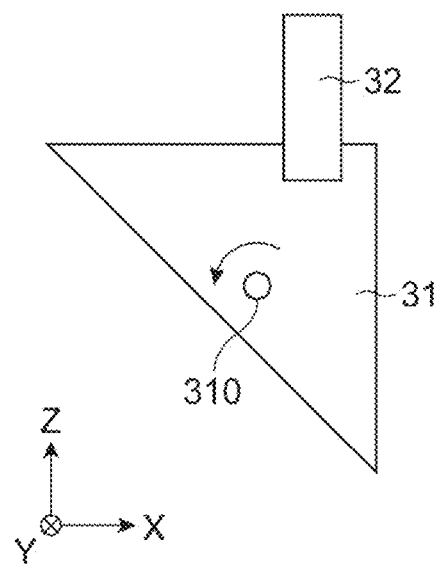
FIG. 3B is a side view for explaining the step of preparing the rotating component 31 and the fixture 32.

In addition, in the method for manufacturing the optical connection component according to the present embodiment, a rotating component 31 and a fixture 32 are prepared. FIGS. 3A and 3B are views for illustrating a step of preparing the rotating component 31 and the fixture 32 in the method for manufacturing the optical connection component according to the present embodiment. Note that FIG. 3A is a top view, and FIG. 3B is a side view.

In the example illustrated in FIGS. 3A and 3B, the rotating component 31 is freely rotatable about a rotary shaft 310. The fixture 32 is attached to the rotating component 31 and rotates together with the rotating component 31 along an arrow direction in FIG. 3B. In addition, to the fixture 32, the first fiber fixing component 20A illustrated in FIGS. 1A to 1C or the first fiber fixing component 20B illustrated in FIGS. 2A to 2C is fixed.

Figure 4A:
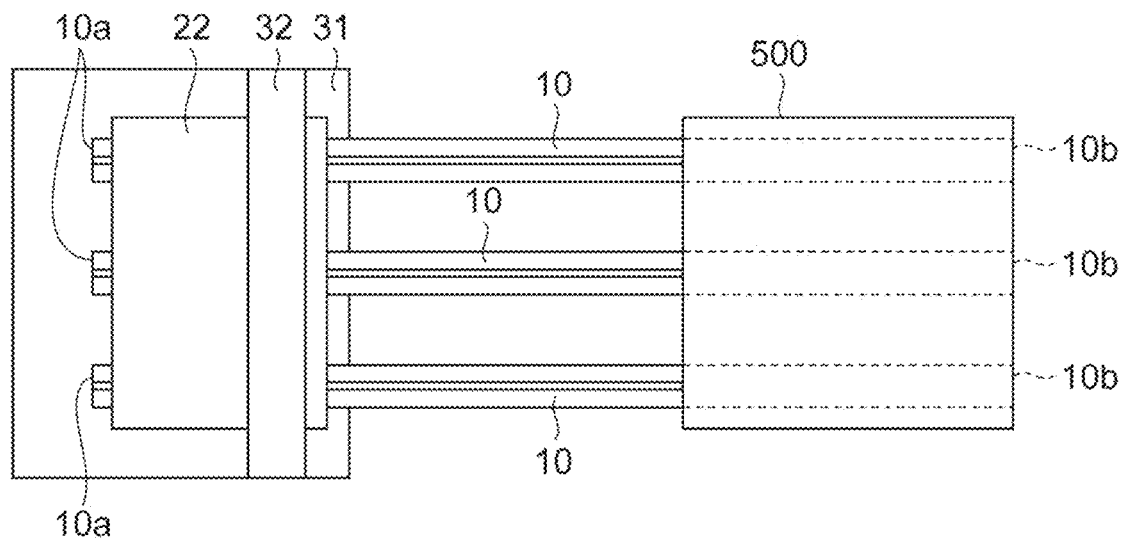
FIG. 4A is a top view for explaining one example of a step of fixing the first fiber fixing component 20A to the fixture 32.
Figure 4B:
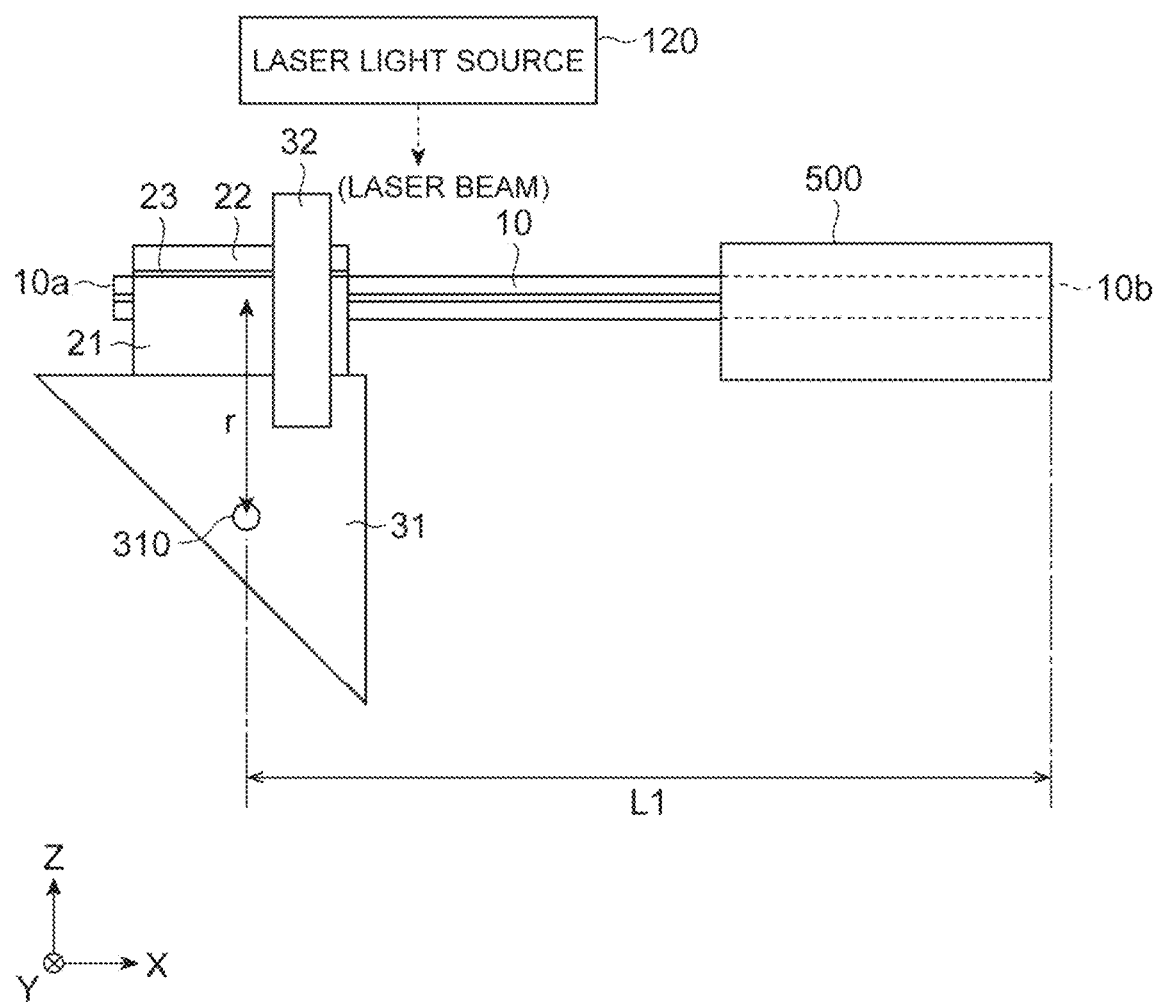
FIG. 4B is a side view for explaining the one example of the step of fixing the first fiber fixing component 20A to the fixture 32.

FIGS. 4A and 4B are views for illustrating a step of fixing the first fiber fixing component 20A to the fixture 32, as a step of the method for manufacturing the optical connection component according to the present embodiment. Note that FIG. 4A is a top view, and FIG. 4B is a side view. In addition, unless otherwise described, the following bending processing operation is carried out in a state where the first fiber fixing component 20A is fitted to one end part of the optical fiber 10 and the other end part of the optical fiber 10 is gripped by a second fiber fixing component 500.

In a state where the first fiber fixing component 20A is fixed to the fixture 32, the three optical fibers 10 arranged in parallel extend in the direction vertical to the rotary shaft 310 of the rotating component 31, and the distances from the rotary shaft 310 of the rotating component 31 to the three optical fibers 10 are constant. In the example of FIG. 4B, the distance between the rotary shaft 310 and the rear end of the second fiber fixing component 500 is L1, and the shortest distance from the rotary shaft 310 to the center axis of the optical fiber 10 is r. At this time, by rotating the rotating component 31 about the rotary shaft 310 by an angle θ, the first fiber fixing component 20A moves by rθ on the circumference of a radius r around the rotary shaft 310 (posture change of the first fiber fixing component 20A). In addition, the rotating component 31 has a shape that does not contact part of the optical fiber 10 located between the first fiber fixing component 20A and the second fiber fixing component 500 when rotated by 90° (a shape defined by the X-Z plane). Since a gap is provided between the outer peripheral surface of the rotating component 31 and the optical fiber 10, the optical fiber 10 is prevented from being scratched, and the optical fiber 10 can be prevented from being broken. On a second end 10b side opposite to the first end 10a side of the optical fiber 10 fixed to the fixture 32, the optical fiber 10 is gripped by the second fiber fixing component 500 in a state of being held horizontally so that no tension is applied in the axial direction on the optical fiber 10. In the present embodiment, the second fiber fixing component 500 constitutes part of a fiber feeding mechanism and functions so as to prevent the second end 10b side of the optical fiber 10 from jumping up.

Figure 5A:
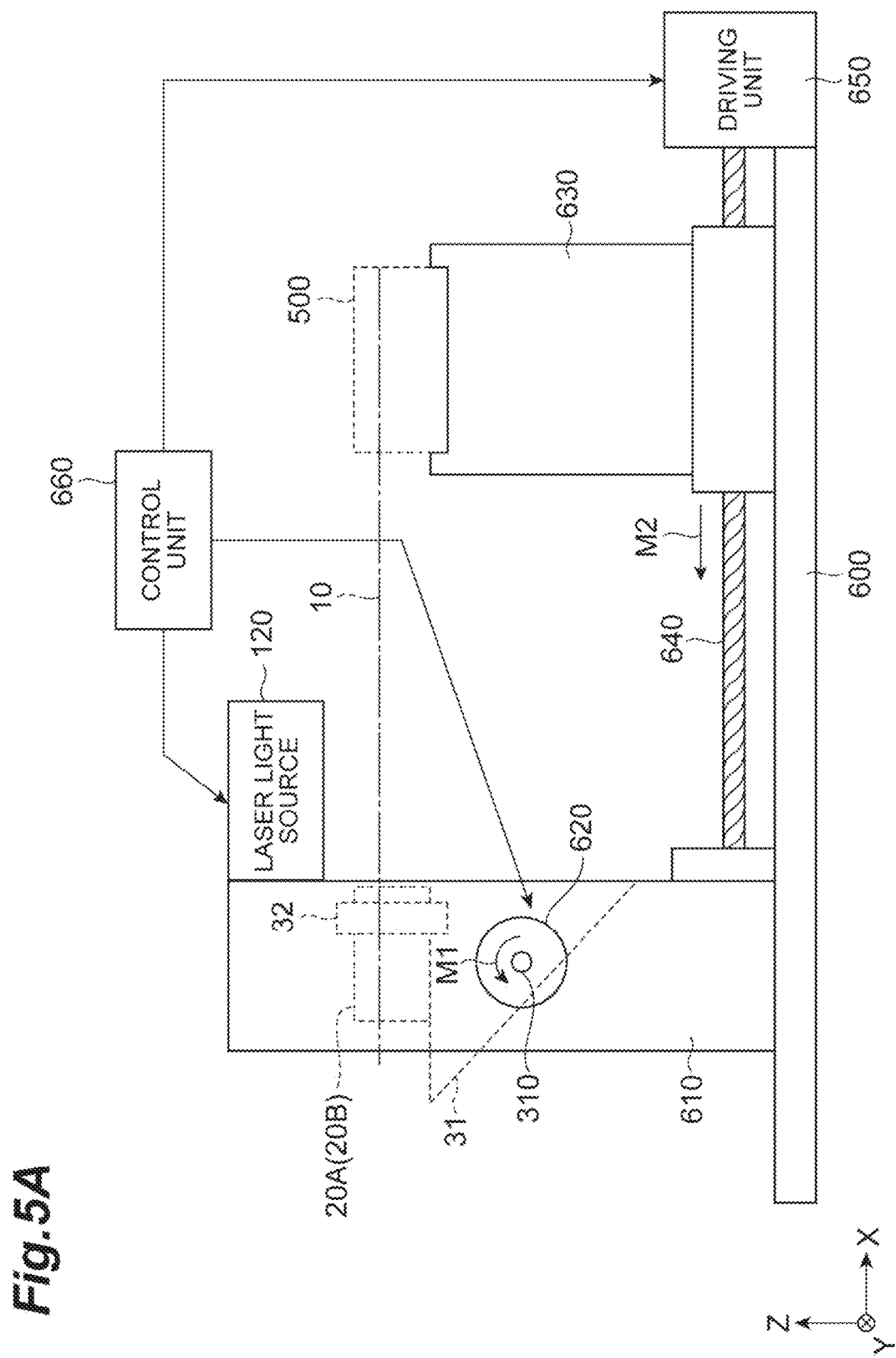
FIG. 5A is a diagram illustrating a configuration of a manufacturing apparatus for implementing a method for manufacturing an optical connection component according to the present embodiment.
Figure 5B:
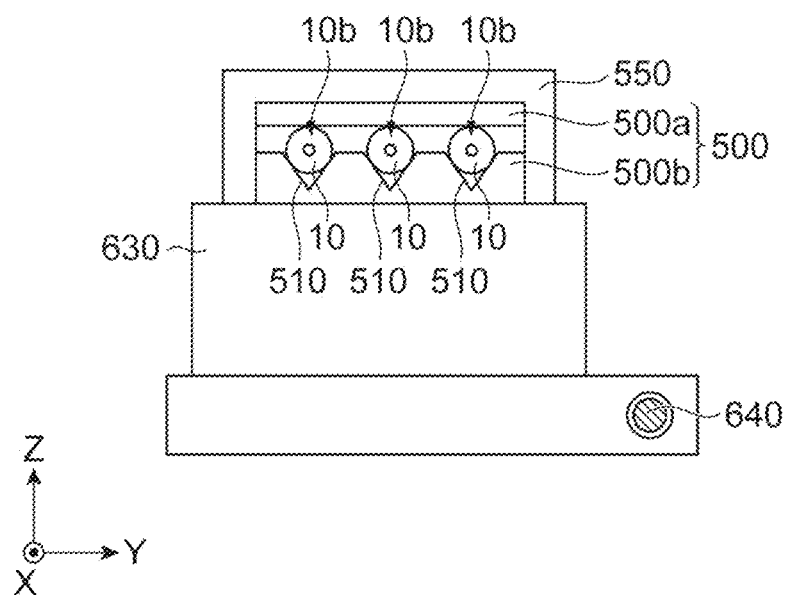
FIG. 5B is a front view of a fiber feeding mechanism in the manufacturing apparatus illustrated in FIG. 5A as seen from behind.

FIG. 5A is a diagram illustrating a configuration of a manufacturing apparatus for implementing the method for manufacturing an optical connection component according to the present embodiment, and FIG. 5B is a front view illustrating the fiber feeding mechanism in the manufacturing apparatus illustrated in FIG. 5A from behind. Therefore, the configuration illustrated in FIG. 4A corresponds to the top view of the manufacturing apparatus in FIG. 5A, and the configuration illustrated in FIG. 4B corresponds to the side view of the manufacturing apparatus in FIG. 5A.

As illustrated in FIG. 5A, the manufacturing apparatus for implementing the method for manufacturing the optical connection component according to the present embodiment comprises a working stage 600. On the working stage 600, a support base 610 for holding a rotating mechanism 620 (for example, a stepping motor or the like) for changing the posture of the first fiber fixing component 20A (20B) and a laser light source 120 at predetermined locations, and the fiber feeding mechanism are provided. The rotating mechanism 620 has the rotary shaft 310 that rotates in the direction indicated by arrow M1, and holds the rotating component 31 to which the first fiber fixing component 20A (or the first fiber fixing component 20B) is fixed by the fixture 32. By rotating the rotating component 31 about the rotary shaft 310, the posture of the first fiber fixing component 20A can be changed. The fiber feeding mechanism comprises the second fiber fixing component 500, a gripping stage 630 that holds the second fiber fixing component 500, a rail 640 that defines a movement direction (direction indicated by arrow M2) of the gripping stage 630, and a driving unit 650 for moving the gripping stage 630 along the rail 640. In addition, laser irradiation from the laser light source 120, rotation operation of the rotary shaft 310 in the rotating mechanism 620, and movement operation of the gripping stage 630 by the driving unit 650 are collectively controlled by a control unit 660.

The first fiber fixing component 20A is fitted to one end part of the optical fiber 10 by inserting the one end part of the optical fiber 10 into the space defined by the V-groove substrate 21 and the lid 22. In contrast, as illustrated in FIG. 5B, the other end of the optical fiber 10 is gripped by the second fiber fixing component 500 so that the relative positions of the optical fiber 10 and the second fiber fixing component 500 do not change. Note that the second fiber fixing component 500 is configured of a lid 500a that restricts movement of the optical fiber 10 along the Z direction and a V-groove substrate 500b that has a V-groove 510 in which the optical fiber 10 is disposed. The second fiber fixing component 500 is fixed to the upper part of the gripping stage 630 by a fixture 550. In the rail 640, a thread groove is formed in a spiral shape along the longitudinal direction of the rail 640, and a thread ridge is formed on the inner peripheral surface of a through hole of the gripping stage 630 through which the rail 640 passes. In a state where the rail 640 inserted into the through hole of the gripping stage 630, the thread groove of the rail 640 and the thread ridge of the gripping stage 630 are meshed with each other. If the driving unit 650 rotates the rail 640 about the X axis (which matches the center axis of the rail 640), the gripping stage 630 can move at least in the direction indicated by arrow M2 (X-axis direction).

For example, a case will be considered where the control unit 660 causes the rotary shaft 310 to rotate by an angle θ with respect to the rotating mechanism 620. In this case, the posture of the first fiber fixing component 20A fixed to the rotating component 31 changes, and a bent portion is formed in the optical fiber 10 by this change in posture. Note that even though the one end part of the optical fiber 10 is not fixed to the first fiber fixing component 20A, the other end part of the optical fiber 10 is fixed to the gripping stage 630 via the second fiber fixing component 500. In this case, although it is possible to form a bent portion in the optical fiber 10 by changing the posture of the first fiber fixing component 20A, it is not possible to shift the location where a bent portion is formed along the longitudinal direction of the optical fiber 10 (Only the relative positions of the one end part of the optical fiber 10 and the first fiber fixing component 20A change). Therefore, the control unit 660 causes the driving unit 650 to move the gripping stage 630 in the direction indicated by arrow M2 by the movement distance rθ resulting from the change in posture of the first fiber fixing component 20A. Such feeding operation of the optical fiber 10 enables the location where a bent portion is formed (that is, laser beam irradiation location) along the longitudinal direction of the optical fiber 10.

Figure 6A:
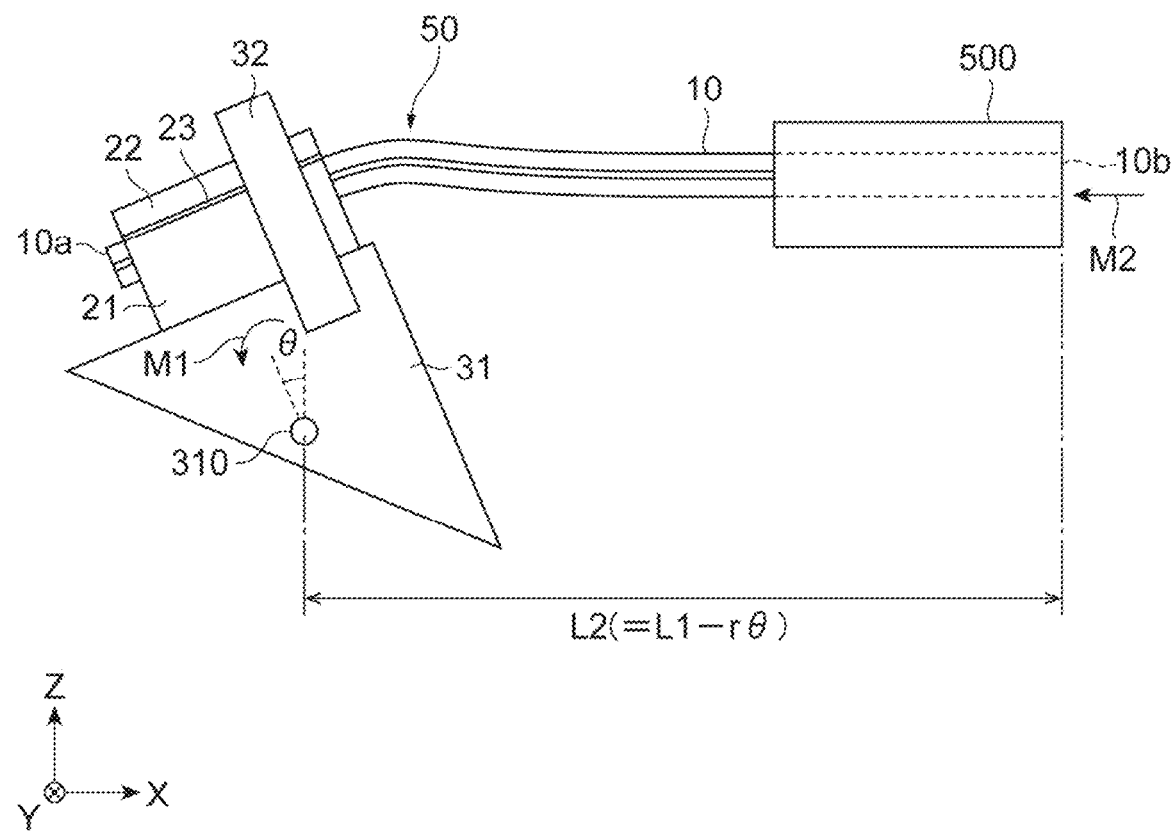
FIG. 6A is a side view for explaining an elastic bending step of forming a bent portion in the optical fiber by bending a partial region of the optical fiber 10 to which the first fiber fixing component 20A is fitted.

FIG. 6A is a side view for illustrating an elastic bending step as one step of the method for manufacturing the optical connection component according to the present embodiment. In this elastic bending step, a partial region of the optical fiber 10 is bent by rotating the rotating component 31 about the rotary shaft 310 by the angle θ in the direction indicated by arrow M1. As a result, a bent portion 50 is formed in the partial region which is bent. Note that as illustrated in FIG. 4B, assuming that the shortest distance between the rotary shaft 310 and the optical fiber 10 is r, since the first fiber fixing component 20A moves by rθ, the optical fiber 10 is fed by rθ in the direction indicated by arrow M2 (toward the first fiber fixing component 20A) together with rotating operation of the rotating component 31. At this time, the distance L2 between the rotary shaft 310 and the rear end part of the second fiber fixing component 500 is L1−rθ. The second end 10b side of the optical fiber 10 is horizontally held by the second fiber fixing component 500, whereas the fixed location and the held direction change on the first end 10a side of the optical fiber 10 fixed by the fixture 32 (change in posture of the first fiber fixing component 20A). Due to movement of the optical fiber 10 and the change in posture of the first fiber fixing component 20A as described above, the bent portion 50 is formed in the partial region of the optical fiber 10. Normally, due to rigidity of the optical fiber 10, a bend (sharp bend) with a bending radius smaller than an intended desired bending radius may be generated near the bent portion 50. However, in the present embodiment, since the optical fiber 10 is movable within the first fiber fixing component 20A, it is less likely that a sharp bend (maximum curvature change) will be formed at the bent portion.

Figure 6B:
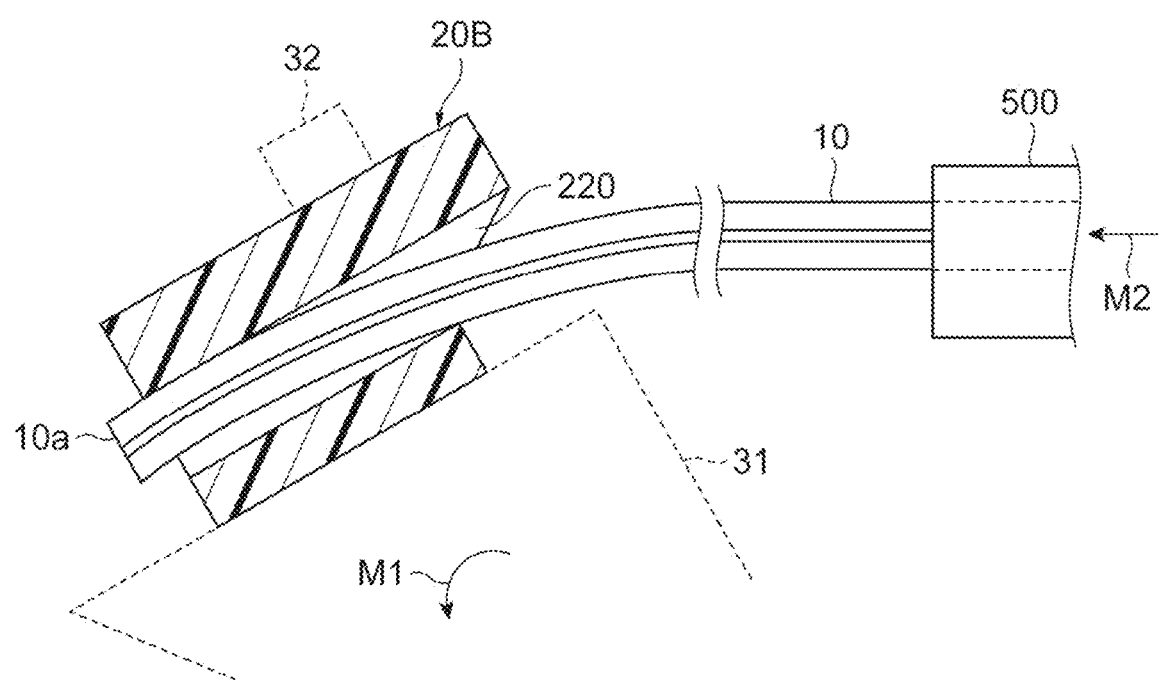
FIG. 6B is a cross-sectional view for explaining the elastic bending step of forming the bent portion in the optical fiber by bending the partial region of the optical fiber 10 to which the first fiber fixing component 20B is fitted.

Note that FIG. 6B is a view illustrating the deformed state of the optical fiber 10 in the first fiber fixing component 20B in a case where the first fiber fixing component 20B (FIGS. 2A to 2C) is applied in lieu of the first fiber fixing component 20A. As can be seen from FIG. 6B, the through hole 220 functions so as to allow movement of the optical fiber 10 along the longitudinal direction and to limit movement of the optical fiber 10 in a direction orthogonal to the longitudinal direction. In addition, the first fiber fixing component 20A also has the function of limiting the movement of the optical fiber 10 as described above.

Figure 7A:
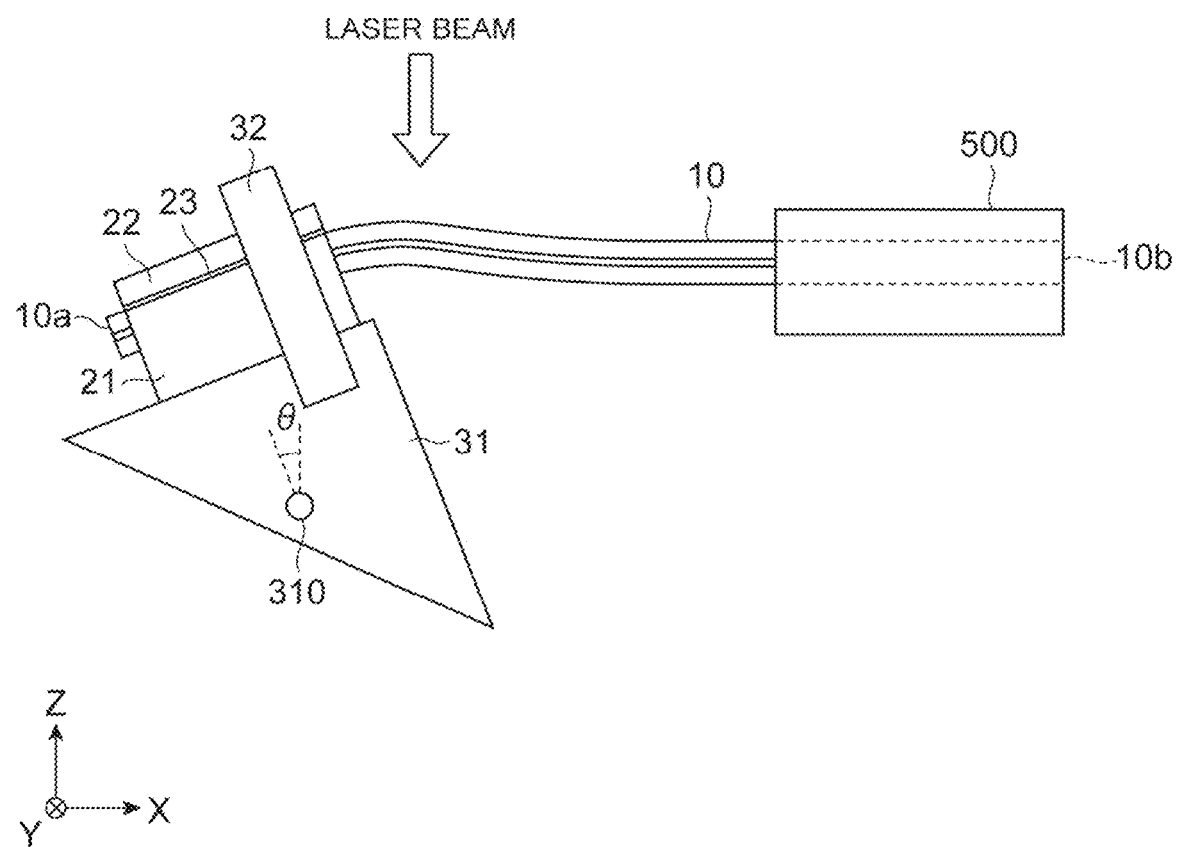
FIG. 7A is a side view for explaining a heating step of heating the bent portion by irradiating the bent portion with a laser beam to soften the bent portion and thereby releasing stress in the bent portion.

FIG. 7A is a side view for illustrating a heating step using laser beam irradiation as one step of the method for manufacturing the optical connection component according to the present embodiment. In this heating step, the bent portion formed in the elastic bending step is softened by heating the bent portion (portion 50 illustrated in FIG. 6A) using laser beam irradiation, and thus stress in the bent portion is released. Due to this heating step, the curvature radius of the region (bent region) including the bent portion of the optical fiber 10 is made closer to a desired bending radius. Laser beam irradiation is stopped after the stress is released. Note that as an example, the irradiation time and the output power of the laser beam in laser beam irradiation performed once are preferably set such that the change amount of optical transmission loss of the optical fiber 10 after the heating step using laser beam irradiation from transmission loss of the optical fiber 10 before the elastic bending step is equal to or less than a predetermined value. An infrared to near infrared laser beam capable of heating silica-based glass is sufficient for the laser beam used here, and power of light having wavelengths of 1.06 μm or more is preferably more than half of the total power. In addition, it is preferable that the laser beam wavelength is in an infrared region of 1.5 μm or more and 5 μm or less. For example, an infrared CW laser beam outputted from a $CO_2$ laser light source is used.

Figure 7B:
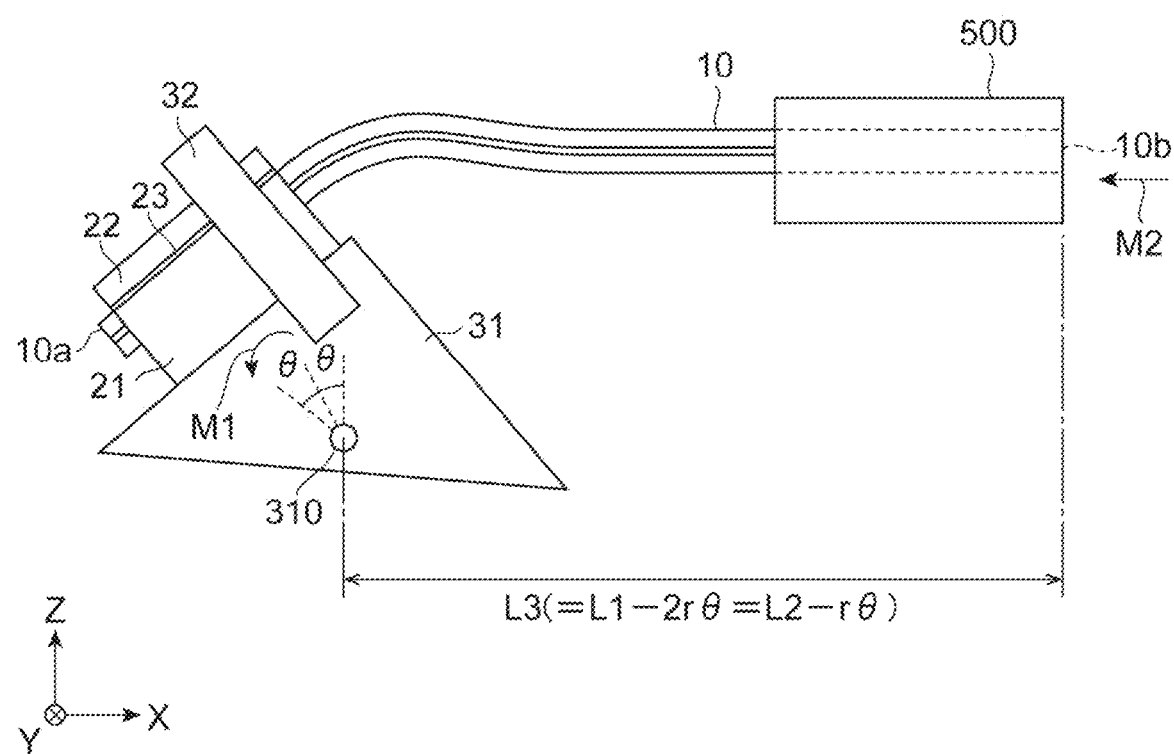
FIG. 7B is a side view for explaining an elastic bending step after the heating step using laser beam irradiation in FIG. 7A.
Figure 7C:
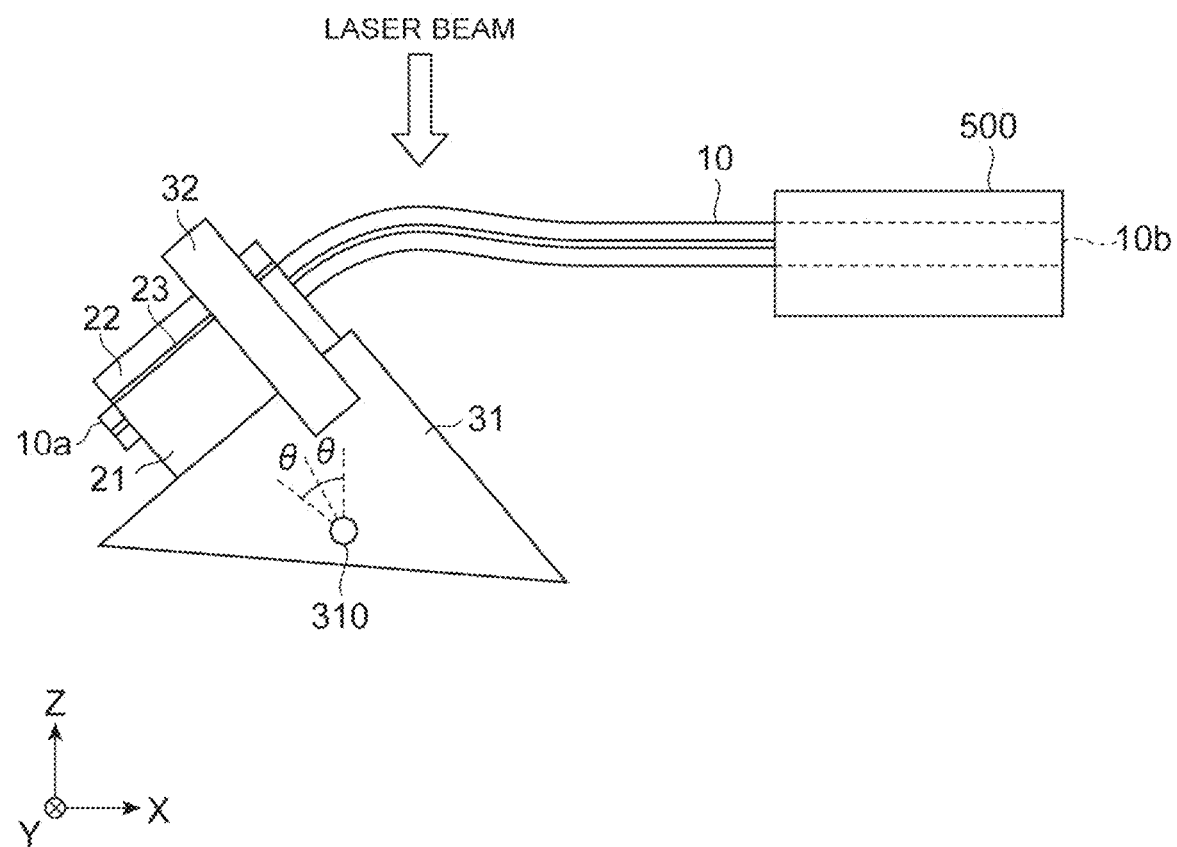
FIG. 7C is a side view for explaining the heating step using laser beam irradiation after the elastic bending step of FIG. 7B.

The elastic bending step and the heating step using laser beam irradiation as described above are repeated while intermittently moving the optical fiber 10 by the fiber feeding mechanism. That is, in the elastic bending step, bent portions are formed in a plurality of regions separated from each other along the longitudinal direction of the optical fiber 10. In addition, in the heating step, the plurality of bent portions formed in the elastic bending step are softened by heating the bent portions using laser beam irradiation, and thus stress in each of the plurality of bent portions is released. FIG. 7B is a side view for illustrating the elastic bending step after the heating step using laser beam irradiation in FIG. 7A. In addition, FIG. 7C is a side view for illustrating the heating step using laser beam irradiation after the elastic bending step of FIG. 7B. As illustrated in FIG. 7B, the rotating component 31 is further rotated by the angle θ from the state illustrated in FIG. 6A, the second fiber fixing component 500 is moved by rθ toward the first fiber fixing component 20A by the fiber feeding mechanism, and therefore a new bent portion is formed. At this time, the control unit 660 controls the driving unit 650 so that a distance L3 between the rotary shaft 310 and the rear end of the second fiber fixing component 500 is L2−rθ (=L1−2rθ). When the new bent portion is formed (FIG. 7B), as illustrated in FIG. 7C, stress in the bent portion is released by laser beam irradiation. During the period in which the optical fiber 10 is being bent by rotating the rotating component 31 while moving the optical fiber 10 by the fiber feeding mechanism, laser beam irradiation is stopped. Such intermittent laser beam irradiation is preferable because excessive heating of the optical fiber 10 can be suppressed. Finally, a bent optical fiber which has the bent region (including one or a plurality of bent portions) having a desired bent angle and bending radius as a whole and in which optical transmission loss is maintained within an allowable range can be manufactured.

Note that it is preferable that a plurality of optical fibers arranged in parallel in a predetermined direction in the elastic bending step are bent collectively, and a bent portion is formed in each of the plurality of optical fibers, as in the present embodiment. In this case, in the heating step using laser beam irradiation, it is preferable that each of the bent portions of the plurality of optical fibers is irradiated with a laser beam according to the following aspects. This makes it possible to efficiently manufacture a plurality of bent optical fibers.

That is, in a first aspect of the heating step using laser beam irradiation, each of the bent portions of the plurality of optical fibers is collectively irradiated with a linear laser beam having a non-circular beam cross-section long in a predetermined direction (direction in which the optical fibers are arranged in parallel). According to the first aspect, each of the bent portions of the plurality of optical fibers is heated by irradiation of the laser beam having the non-circular beam cross-section as described above so that each of the bent portions of the plurality of optical fibers is softened, and therefore stress in each of the bent portions of the plurality of optical fibers is released. In a second aspect of the heating step, the laser beam irradiation location on each of the bent portions of the plurality of optical fibers is scanned along the predetermined direction by the laser beam scanning mechanism (for example, a galvano scanner, a polygon mirror, or the like). Each of the bent portions of the plurality of optical fibers is heated by scanning of the laser beam irradiation location as described above so that each of the bent portions of the plurality of optical fibers is softened, and therefore stress in each of the bent portions of the plurality of optical fibers is released. In addition, in a third aspect of the heating step, the laser beam irradiation location on each of the bent portions of the plurality of optical fibers may be scanned in the predetermined direction by the optical fiber moving mechanism (for example, a stepping motor). Each of the bent portions of the plurality of optical fibers is heated by scanning of the laser beam irradiation location as described above so that each of the bent portions of the plurality of optical fibers is softened, and therefore stress in each of the bent portions of the plurality of optical fibers is released.

Figure 8B:
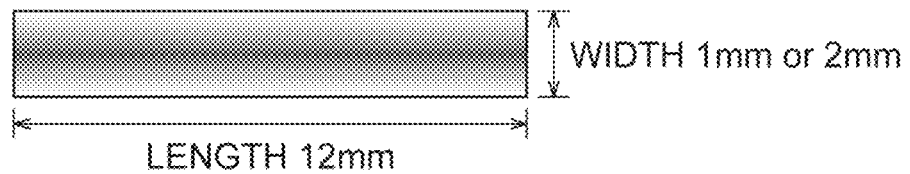
FIG. 8B is a view illustrating a beam cross-section of a linear laser beam emitted to the bent portions of the plurality of optical fibers in the heating step using laser beam irradiation.

In the first aspect of the heating step using laser beam irradiation, as illustrated in FIGS. 8A and 8B, it is preferable that a linear laser beam L having a beam cross-sectional shape long in the predetermined direction (direction in which the optical fibers are arranged in parallel) has a beam width and power distribution in a direction vertical to the predetermined direction (axial direction of the optical fiber) uniform in the predetermined direction. The relationship among laser beam irradiation time, laser beam irradiation output, and the linear laser beam is verified and grasped in advance, and is appropriately optimized. Compared with the first aspect, in the second aspect and the third aspect, it is possible to increase the power of the laser beam emitted to the bent portion of each of the plurality of optical fibers, and to make the power of the laser beam constant.

Figure 9:
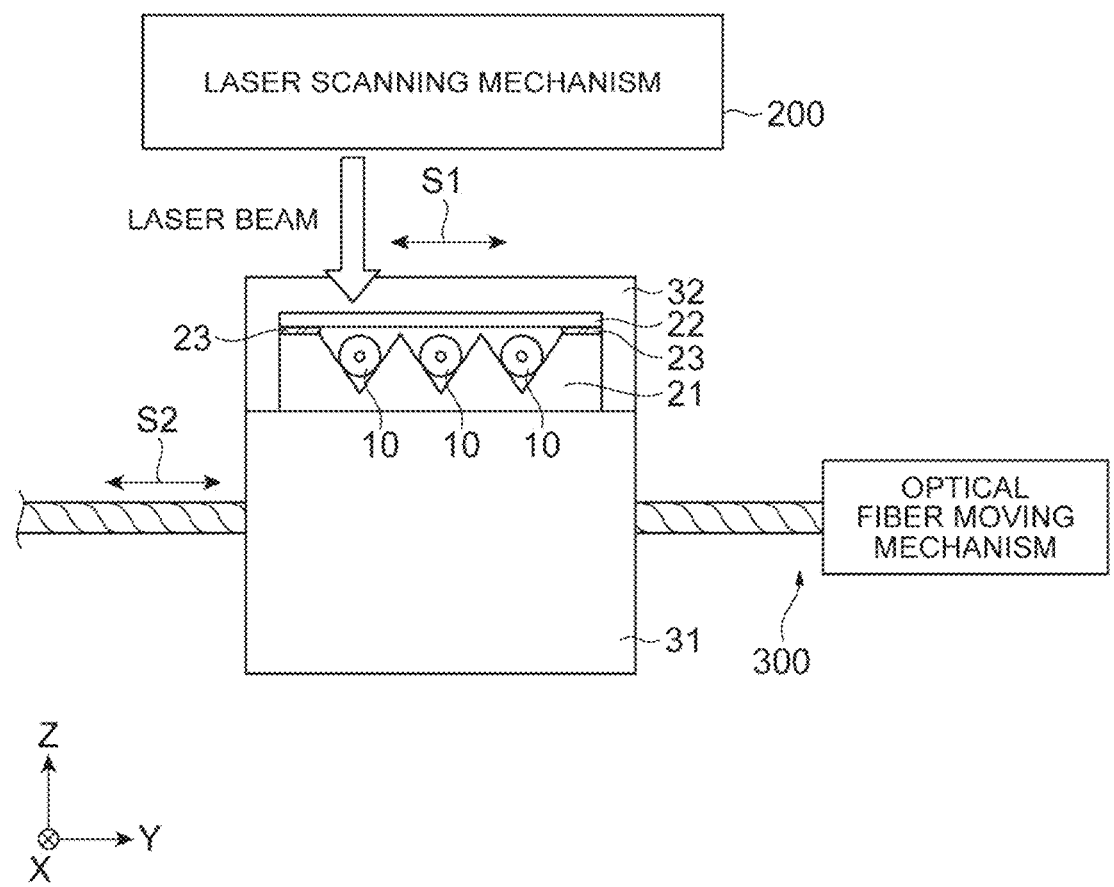
FIG. 9 is a diagram for explaining operation of a laser beam scanning mechanism for implementing another aspect in the heating step using laser beam irradiation and operation of an optical fiber moving mechanism for implementing still another aspect in the heating step using laser beam irradiation.

FIG. 9 is a diagram for collectively explaining operation of a laser beam scanning mechanism for implementing the second aspect in the heating step described above and operation of an optical fiber moving mechanism for implementing the third aspect. Note that only one of the second aspect and the third aspect may be implemented. As illustrated in FIG. 9, a laser beam scanning mechanism 200 for implementing the second aspect scans the laser beam irradiation location in each bent portion of the optical fiber 10 in the direction indicated by arrow S1. As a result, each of the bent portions is heated. In contrast, an optical fiber moving mechanism 300 for implementing the third aspect moves the rotating component 31 itself to which the first end 10a side of the optical fiber 10 is fixed, in the direction indicated by arrow S2. As a result, the relative irradiation location of the laser beam on each bent portion of the optical fibers 10 is scanned in the direction indicated by arrow S2. As a result, each of the bent portions is heated.

Next, a specific example of the method for manufacturing the optical connection component according to the present embodiment will be described. In the following specific example, a bent optical fiber was manufactured by subjecting an optical fiber to processing (including the elastic bending step and the heating step using laser beam irradiation) according to predetermined processing conditions. Note that the first fiber fixing component illustrated in FIGS. 2A to 2C is fitted to one end part of the prepared optical fiber. In addition, the other end part of the optical fiber is gripped by the second fiber fixing component (included in the fiber feeding mechanism).

The outer diameter of the prepared optical fiber was 125 μm, and the number of optical fibers was one. The first fiber fixing component used was a single member having a through hole with the longitudinal length of 5 mm. By inserting the optical fiber into this through hole, the first fiber fixing component is fitted to the one end part of the optical fiber. Note that in this fitted state, the optical fiber and the first fiber fixing component are not bonded. The distance between the outer periphery of the rotating component and the optical fiber was 0.5 mm, and the turning radius was 3 mm. In the heating step, a CW laser beam having a wavelength of 10.6 μm was used as a laser beam outputted from the $CO_2$ laser light source. As illustrated in FIG. 8B, this laser beam is a laser beam (linear laser beam) having a linear beam cross section with a length of 12 mm. The beam cross-sectional dimensions (length and width) of the linear laser beam were confirmed by an irradiation mark on an acrylic plate. The targeted bending radius was 3 mm and the targeted entire bent angle was 82°.

In addition, the number of times that laser beam irradiation is performed (the number of bent portions) was 41, the average output power of the laser beam was 20 W, the laser beam irradiation time per laser beam irradiation performed once was 1 second, the beam width of the linear laser beam was 1 mm, and the bent angle per laser beam irradiation performed once was 2°.

Figure 10A:
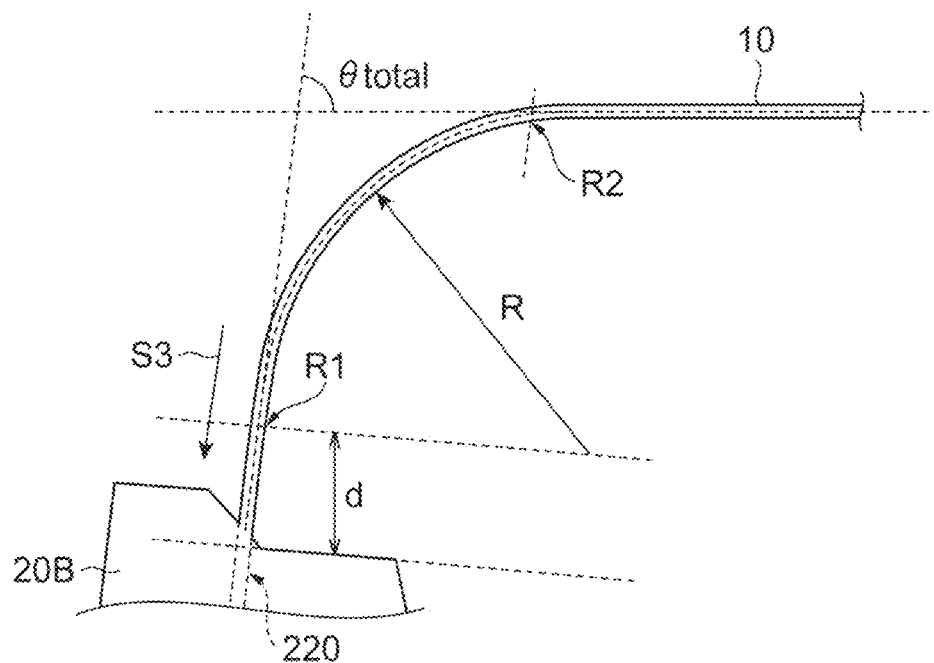
FIG. 10A is a view for explaining position adjustment operation of the first fiber fixing component with respect to the bent optical fiber obtained, as a fixing step.

FIG. 10A is a view of the first fiber fixing component and a bent optical fiber manufactured under the above-described processing conditions and having a bent region formed in the section from a start end R1 to a terminal end R2, before being fixed to each other. In this bent optical fiber, no laser beam irradiation mark, breakage, and thinning were observed. A distance d from the end part of the first fiber fixing component to the start end R1 of the bent portion was 1.1 mm. The bending radius R of the manufactured bent optical fiber was 2.9 mm, which was approximately equal to the target value 3 mm. The entire bent angle $\theta_{total}$ of the manufactured bent optical fiber was 82.5°, which was approximately equal to the target value of 82°.

Figure 10B:
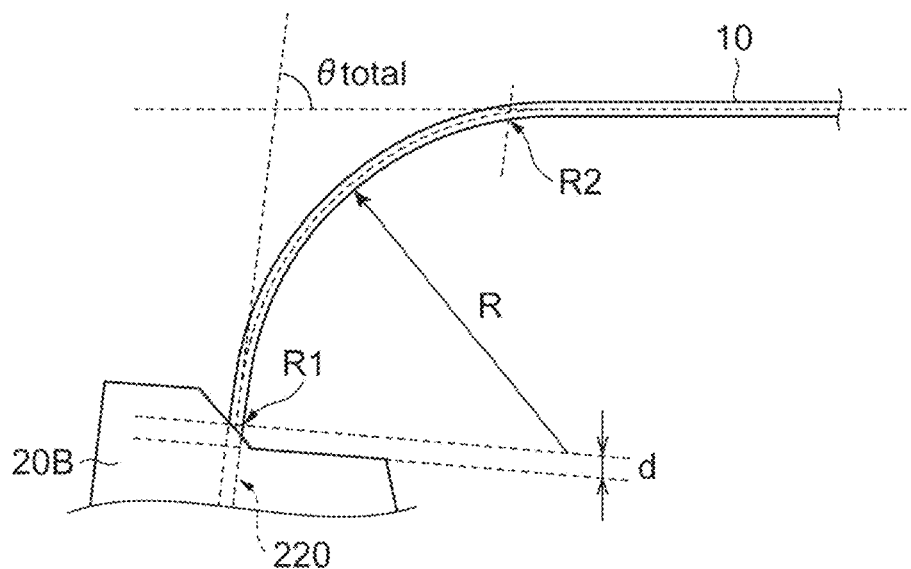
FIG. 10B is a view for explaining a state after position adjustment of the first fiber fixing component with respect to the bent optical fiber obtained, as the fixing step.

In manufacture of a bent optical fiber in a state where the fiber fixing component is fixed to the one end part of the bent optical fiber, it is necessary to secure the distance d in order to avoid influence of laser irradiation such as thermal deformation of the fiber fixing component. However, in the present embodiment, as illustrated in FIG. 10B, it is also possible to set the distance d to 0 in the fixing step after the heating step using laser irradiation. That is, after completion of the bent optical fiber, in the fixing step of the present embodiment, as illustrated in FIG. 10B, by moving the bent optical fiber along the longitudinal direction thereof (direction indicated by arrow S3 in FIG. 10A) toward the first fiber component already fitted, the distance d from the end part of the first fiber fixing component to the start end R1 of the bent portion is adjusted. When adjustment of the distance d is completed, the bent optical fiber obtained and the first fiber fixing component are bonded and fixed to each other. Note that in order to reduce the height of the optical fiber, it is preferable that the start end R1 of the bent portion in the bent optical fiber matches with the end part of the first fiber fixing component (d=0).

REFERENCE SIGNS LIST

10 . . . Optical fiber; 11 . . . Core; 12 . . . Cladding; 20A, 20B . . . First fiber fixing component; 21 . . . V-groove substrate; 22 . . . Lid (Cover glass); 31 . . . Rotating component; 32 . . . Fixture; 500 . . . Second fiber fixing component; 500a . . . Lid; 500b V-groove substrate; 550 . . . Fixture; 630 . . . Gripping stage; 620 . . . Rotating mechanism (Stepping motor); 640 . . . Rail; 650 . . . Driving unit; and 660 . . . Control unit.

The invention claimed is:

1. A method for manufacturing an optical connection component including a bent optical fiber having a bent-shape part and a fiber fixing component attached to the bent optical fiber, the method comprising:
   a pre-step of preparing an optical fiber comprised of silica-based glass and the fiber fixing component, the fiber fixing component having a structure for limiting movement of the optical fiber in a direction orthogonal to a longitudinal direction of the optical fiber;
   a fitting step of fitting the fiber fixing component on one end part of the optical fiber in a state movable in the longitudinal direction, fixing the fiber fixing component to a rotating component rotatable about a predetermined rotary shaft, and fixing the other end part of the optical fiber to a fiber feeding mechanism,
   a bent optical fiber manufacturing step of, to form the bent-shape part in the optical fiber, forming a plurality of bent portions in the optical fiber, the plurality of bent portions being separated from each other along the longitudinal direction;
   a step of adjusting, after the bent optical fiber manufacturing step, relative positions of the bent-shape part and the fiber fixing component while fitting the fiber fixing component on the one end part of the bent optical fiber; and
   a fixing step of fixing, after the adjusting, the fiber fixing component to the bent optical fiber,
   wherein the bent optical fiber manufacturing step includes:
   an elastic bending step of, to form a bent portion in the optical fiber, inclining a posture of the fiber fixing component by a predetermined angle with respect to a feeding direction of the optical fiber while feeding the optical fiber toward the fiber fixing component by the fiber feeding mechanism; and
   a heating step of heating and softening the bent portion to release stress in the bent portion, and
   wherein a pair of the elastic bending step and the heating step is repeated a plurality of times to form the plurality of bent portions separated from each other along the longitudinal direction in the optical fiber, while changing an inclination angle of the fiber fixing component with respect to the feeding direction of the optical fiber in the elastic bending step so that the inclination angle becomes greater stepwise every time the elastic bending step is performed.

2. The method for manufacturing the optical connection component according to claim 1,
   wherein in the fixing step, an end part of the fiber fixing component and a start end of the bent-shape part of the bent optical fiber match with each other.

3. The method for manufacturing the optical connection component according to claim 2,
   wherein the heating step includes emitting a laser beam to heat the bent portion.

4. The method for manufacturing the optical connection component according to claim 3,
   wherein the fitting step includes fixing the fiber fixing component to a rotating component rotatable about a predetermined rotary shaft, and
   the elastic bending step includes rotating the rotating component about the rotary shaft in a state where the fiber fixing component is fixed to change the posture of the fiber fixing component with respect to the feeding direction of the optical fiber.

5. The method for manufacturing the optical connection component according to claim 1,
   wherein the heating step includes emitting a laser beam to heat the bent portion.

6. The method for manufacturing the optical connection component according to claim 5,
   wherein the elastic bending step includes rotating the rotating component about the rotary shaft in a state where the fiber fixing component is fixed to change the posture of the fiber fixing component with respect to the feeding direction of the optical fiber.

7. The method for manufacturing the optical connection component according to claim 1,
   wherein the pre-step includes preparing a plurality of optical fibers including the optical fiber,
   the fitting step includes fitting the fiber fixing component to one end part of each of the plurality of optical fibers arranged in parallel in a predetermined direction in a state movable in a longitudinal direction of the plurality of optical fibers, and fixing the other end of each of the plurality of optical fibers to the fiber feeding mechanism, and
   for each of the plurality of optical fibers to which the fiber fixing component is movably fitted, the bent optical fiber manufacturing step and the fixing step are carried out.

* * * * *